(12) United States Patent
Schindler et al.

(10) Patent No.: US 9,855,904 B2
(45) Date of Patent: Jan. 2, 2018

(54) COUPLING STORE DEVICE FOR A MOTOR VEHICLE

(71) Applicant: Bayerische Motoren Werke Aktiengesellschaft, Munich (DE)

(72) Inventors: Moritz Schindler, Munich (DE); Stefan Schaeck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 14/665,020

(22) Filed: Mar. 23, 2015

(65) Prior Publication Data

US 2015/0191139 A1 Jul. 9, 2015

Related U.S. Application Data

(63) Continuation of application No. PCT/EP2013/069487, filed on Sep. 19, 2013.

(30) Foreign Application Priority Data

Sep. 24, 2012 (DE) .................... 10 2012 217 190

(51) Int. Cl.
*B60R 16/033* (2006.01)
*B60L 11/18* (2006.01)
(Continued)

(52) U.S. Cl.
CPC .............. *B60R 16/033* (2013.01); *B60L 1/00* (2013.01); *B60L 7/10* (2013.01); *B60L 11/1809* (2013.01);
(Continued)

(58) Field of Classification Search
CPC .................................................. B60R 16/033
See application file for complete search history.

(56) References Cited

U.S. PATENT DOCUMENTS

| 6,844,634 B2 | 1/2005 | Kobayashi et al. |
| 9,431,850 B2 * | 8/2016 | Imai ................ H02J 7/1423 |

(Continued)

FOREIGN PATENT DOCUMENTS

| CN | 103229385 A | 7/2013 |
| DE | 10 2009 008 177 A1 | 10/2009 |

(Continued)

OTHER PUBLICATIONS

International Search Report (PCT/ISA/210) dated Jul. 1, 2014, with English translation (six (6) pages).

(Continued)

*Primary Examiner* — Hai L Nguyen
(74) *Attorney, Agent, or Firm* — Crowell & Moring LLP

(57) ABSTRACT

A motor vehicle includes a generator, electric consuming devices, a first electric energy storage device and a second energy storage device connected in parallel with the first energy storage device. The two electric energy storage devices, in a storage range, have at least partially overlapping characteristic open-circuit voltage curves. The first energy storage device has a first state-of-charge-dependent characteristic charging internal-resistance curve. The second energy storage device has a second state-of-charge-dependent characteristic charging internal-resistance curve. The first energy storage device has a first state-of-charge-dependent characteristic discharging internal-resistance curve and the second energy storage device has a second state-of-charge-dependent characteristic discharging internal-resistance curve. The first characteristic charging internal-resistance curve extends over an entire relative state-of-charge range in the direction of higher resistances above the second characteristic charging internal-resistance curve. The first characteristic discharging internal-resistance curve extends over an entire relative state-of-charge range in the direction (Continued)

of higher resistances below the second characteristic discharging internal-resistance curve. The two energy storage devices are interconnected with one another in a voltage-neutral manner.

7 Claims, 4 Drawing Sheets

(51) Int. Cl.
*B60L 1/00* (2006.01)
*B60L 7/10* (2006.01)
*B60W 10/26* (2006.01)
*H02J 7/14* (2006.01)
*H02J 7/34* (2006.01)

(52) U.S. Cl.
CPC ....... *B60L 11/1861* (2013.01); *B60L 11/1862* (2013.01); *B60L 11/1864* (2013.01); *B60L 11/1868* (2013.01); *B60L 11/1879* (2013.01); *B60W 10/26* (2013.01); *H02J 7/1423* (2013.01); *H02J 7/34* (2013.01); *B60L 2240/547* (2013.01); *B60L 2240/549* (2013.01); *Y02T 10/7011* (2013.01); *Y02T 10/7016* (2013.01); *Y02T 10/7044* (2013.01); *Y02T 10/7061* (2013.01); *Y02T 10/7066* (2013.01)

(56) References Cited

U.S. PATENT DOCUMENTS

| | | |
|---|---|---|
| 2004/0201365 A1 | 10/2004 | Dasgupta et al. |
| 2007/0029124 A1 | 2/2007 | DasGupta et al. |
| 2009/0015193 A1 | 1/2009 | Esaka et al. |
| 2009/0243387 A1 | 10/2009 | Conen et al. |
| 2013/0252035 A1* | 9/2013 | Lamp .................. B60L 11/1853 429/9 |

FOREIGN PATENT DOCUMENTS

| | | |
|---|---|---|
| DE | 10 2010 062 116 A1 | 5/2012 |
| EP | 1 595 748 A1 | 11/2005 |
| EP | 2 272 722 A2 | 1/2011 |
| WO | WO 03/088375 A2 | 10/2003 |
| WO | WO 2005/027345 A1 | 3/2005 |

OTHER PUBLICATIONS

German Search Report dated May 31, 2013, with partial English translation (nine (9) pages).
Chinese Office Action issued in counterpart Chinese Application No. 201380049526.2 dated Feb. 25, 2016 with English-language translation (eight (8) pages).

* cited by examiner

COUPLING STORE DEVICE FOR A MOTOR VEHICLE

CROSS REFERENCE TO RELATED APPLICATIONS

This application is a continuation of PCT International Application No. PCT/EP2013/069487, filed Sep. 19, 2013, which claims priority under 35 U.S.C. §119 from German Patent Application No. 10 2012 217 190.8, filed Sep. 24, 2012, the entire disclosures of which are herein expressly incorporated by reference.

BACKGROUND AND SUMMARY OF THE INVENTION

The invention relates to a motor vehicle having a generator, electric consuming devices, a first electric energy storage device and a second energy storage device connected in parallel to the first energy storage device. The two electric energy storage devices having at least partially overlapping characteristic open-circuit voltage curves in the voltage range. The first energy storage device has a first state-of-charge-dependent characteristic charging internal-resistance curve. The second energy storage device has a second state-of-charge-dependent characteristic charging internal-resistance curve. The first energy storage device has a first state-of-charge-dependent characteristic discharging internal-resistance curve and the second energy storage device has a second state-of-charge-dependent characteristic discharging internal-resistance curve.

According to German Patent document DE 10 2009 008 177 A1, in the case of vehicles having a plurality of electric consuming devices (electrical loads), the electric energy supply is ensured by one or more batteries or by a generator. An onboard power supply system architecture having two energy storage devices is suggested, which can be connected electrically in parallel by way of a coupling element. The coupling element is adjusted as a function of the state of the ignition in order to ensure a high availability of the consuming devices in every operating condition of the vehicle and to avoid a starting-voltage drop in the onboard power supply system during engine starts, particularly in the case of an engine start-stop function.

German Patent document DE 10 2010 062 116 A1 describes a 2-energy-storage-device onboard power supply system for a vehicle having two permanently parallel-connected energy storage devices whose characteristic voltage curves partially overlap.

It is an object of the invention to provide an improved motor vehicle equipped with a generator, electric consuming devices, a first electric energy storage device and a second energy storage device connected in parallel to the first energy storage device. The two electric energy storage devices having at least partially overlapping characteristic open-circuit voltage curves in the voltage range. The first energy storage device has a first state-of-charge-dependent characteristic charging internal-resistance curve and the second energy storage device has a second state-of-charge-dependent characteristic charging internal-resistance curve. The first energy storage device has a first state-of-charge-dependent discharging internal-resistance curve and the second energy storage device has a second state-of-charge-dependent characteristic discharging internal-resistance curve.

This and other objects are achieved by a motor according to the invention, wherein the first characteristic charging internal-resistance curve extends over an entire relative state-of-charge range in the direction of higher resistances essentially above the second characteristic charging internal-resistance curve, and the first characteristic discharging internal-resistance curve extends over an entire relative state-of-charge range in the direction of higher resistances essentially below the second characteristic discharging internal-resistance curve. The two energy storage devices are interconnected with one another in a voltage-neutral manner.

The described relative positions of the characteristic charging internal-resistance curves or the characteristic discharging internal-resistance curves may have anomalies in the edge areas of the relative state-of-charge range, i.e. at or close to 0% relative state-of-charge (SoC), as well as at or close to 100% relative state-of-charge, which in these edge areas have a different course than the described essential course. The advantages and effects of the invention remain unaffected by these anomalies, so that the anomalies do not limit the invention. As an example, a considerable rise of the characteristic discharging internal-resistance curve in the case of a lead acid battery as the first energy storage device with respect to the 0% state-of-charge can be mentioned, which possibly exceeds the characteristic discharging internal-resistance curve of a lithium ion battery as the second energy storage device with respect to the 0% state-of-charge in the direction of higher resistances. The characteristic discharging internal-resistance curve of the lead acid battery essentially extends in the direction of higher resistances but below the characteristic discharging internal-resistance curve of the characteristic discharging internal-resistance curve of the lithium ion battery, to which characteristics essential to the invention are linked.

In addition, the considerations of the characteristic resistance curves relate to a temperature range which, when used in automotive engineering, is considered to be a typical temperature range for an energy storage device, i.e. from approximately −20° C. to approximately +60° C.

A voltage-neutral wiring means that, essentially, a direct galvanic connection exists between the two energy storage devices. In particular, voltage-providing or voltage-coupling components, such as a switch, a relay or a d.c. converter, are not necessarily situated between the two energy storage devices. As a result of the parallel connection of the two storage devices, these are therefore on the same electric potential at every operating point. In the following, this voltage will be called the coupling voltage.

According to a preferred embodiment of the invention, the first electric energy storage device, in the case of an approximately fully charged state, has an open-circuit voltage which corresponds essentially to a relative state-of-charge of the second energy storage device in the lower to medium range.

This means that the two energy storage devices are constructed such that the fully charged state of the first energy storage device results in a coupling voltage at which the second energy storage device is in a lower to medium state-of-charge range. The lower to medium state-of-charge range can be estimated at 5%-60% of the relative state-of-charge.

Furthermore, it is a technical advantage for the motor vehicle to include a control unit and a battery sensor, for the battery sensor to be assigned to the second energy storage device and, by the time-related integration of a charging current and of a discharging current of the second energy storage device, for the state-of-charge of the second energy storage device to be determinable by means of the battery sensor and/or of the control unit.

According to a preferred variant of the invention, by way of the control unit, a regenerative charging current of the energy storage device can be set and a consuming-device-related discharging current of the energy storage device can be set, the second electric energy storage device being operated in a time-dependent course in a specified desired state-of-charge range, and the desired state-of-charge range is in the essentially lower to medium state-of-charge range of the second energy storage device.

The second energy storage device is therefore operated in a specified state-of-charge range, which is in the range of lower to medium states of charge of the second energy storage device. This means that, during this operation, the first energy storage device is approximately fully charged.

In addition, it is very advantageous for a regenerative charging current to be settable in a recovery phase by the control unit in a motor vehicle having a braking-energy recovery function, which charging current, in a time-dependent course, results in a state-of-charge of the second energy storage device that is situated in the direction of higher states of charge above the desired state-of-charge range, and in driving phases which do not represent recovery phases, for a regenerative charging current or a consumption-related discharging current to be set by the control unit such that the charging current and the discharging current lead the state-of-charge of the second electric energy storage device in a time-dependent course into the desired state-of-charge range or maintain the state-of-charge of the second electric energy storage device in a time-dependent course in the desired state-of-charge range.

If, as an alternative or in addition to the braking energy recovery function, the motor vehicle has an automatic engine stop-start function, it is an advantageous variant of the invention for a discharge current to be settable in an engine stop phase by the control unit. The discharge current, in a time-dependent course, leads to a state-of-charge of the second energy storage device which is situated in the direction of higher states of charge below the desired state-of-charge range. In driving phases, which represent no engine-stop phase, a regenerative charging current and a consuming-device-related discharging current are set by the control unit such that the charging current and the discharging current lead the state-of-charge of the second electric energy storage device in a time-dependent course into the desired state-of-charge-range or maintain the state-of-charge of the second electric energy storage device in a time-dependent course in the desired state-of-charge range.

The invention is based on the following considerations.

The starting point is a conventional vehicle having a single lead acid battery as its energy storage device for the basic onboard power supply system, wherein the vehicle may be equipped with micro-hybrid functionalities such as a braking energy recovery function (BER) with an automatic engine stop-start system (MSA).

Operating strategies for the conventional onboard power supply system may consist of maximizing the service life of the lead acid battery (LAB). In the LAB technology known to the person skilled in the art, this can be achieved particularly in the case of a lasting full charging of the LAB, i.e. when a full charging strategy is used. However, in order to open up the possibility of the recovery of electric energy converted from kinetic energy also with the LAB, a targetedly partially discharged operation of the LAB is selected, which may have a disadvantageous effect on the service life of the LAB. This may have a particularly disadvantageous effect in unfavorable operating conditions when the state-of-charge of the LAB is additionally lowered by frequent stopping phases by the MSA and by an excessive discharging in the parking and after-running phase of the vehicle.

Modern 2-battery concepts have energy storage devices with different chemical techniques, as, for example, the combination of a lead acid battery with a lithium ion battery (LiB).

In the case of voltage-neutral parallel-connected energy storage devices, i.e. in the case of a galvanic connection, a voltage common to the energy storage devices occurs, which is called a coupling voltage.

For such an energy storage system, a skillful and simultaneously robust operating strategy is provided. This operating strategy makes it possible to utilize the specific advantages of the two energy storage devices of the energy storage device system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
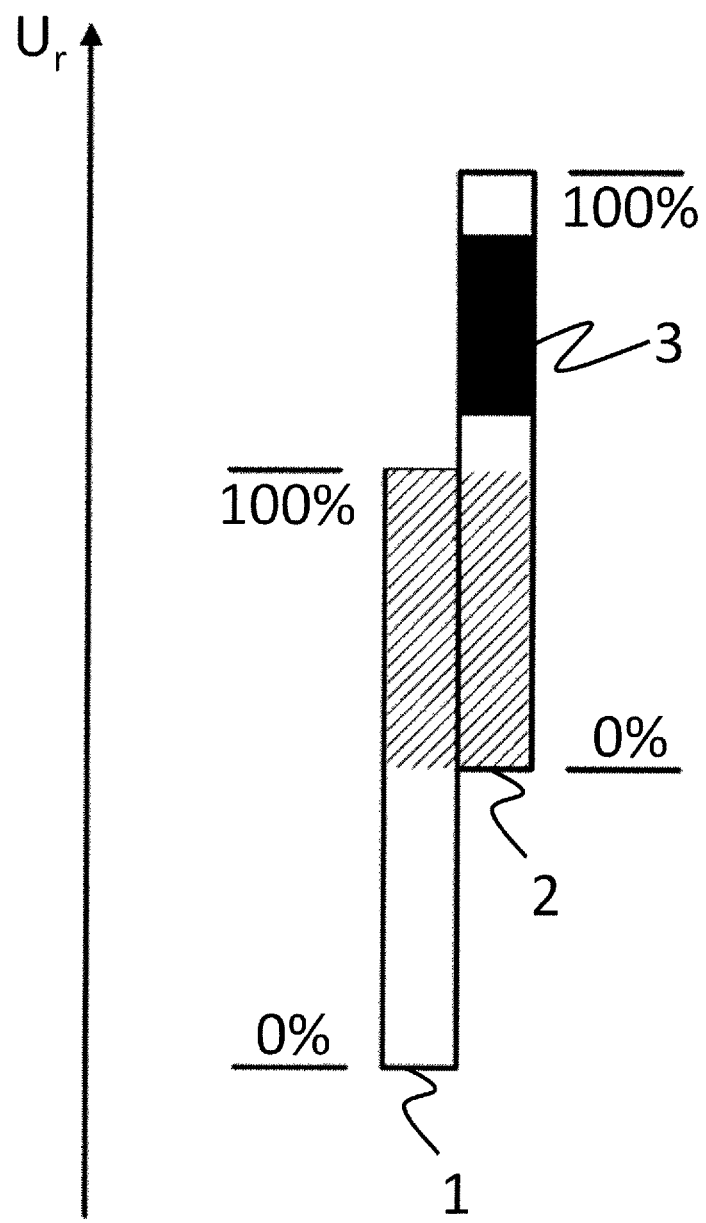
FIG. 1 is a schematic view of the open-circuit voltage level of two energy storage devices in a coupled energy storage system.

According to an embodiment, the electric power supply system of a motor vehicle, in addition to a generator driven by an internal-combustion engine, includes a starter for the internal-combustion engine and a plurality of electric consuming devices. In the onboard power supply system, at least two parallel-connected electric energy storage devices are used as energy sources as well as energy sinks. These energy storage devices preferably have a direct galvanic connection; i.e. the energy storage devices can be permanently operated in a parallel-connected manner. In particular, no voltage-coupling elements between the energy storage devices, such as d.c. converters, disconnecting switches, relays, etc. have to be used. Furthermore, a system of two permanently parallel energy storage devices will be considered, which will be called a coupling energy storage system in the following.

Each of the two storage devices has a characteristic steady-voltage curve as a function of the respective relative state-of-charge of the storage device. The two storage devices are selected such that, over the entire range of the relative state-of-charge, the characteristic steady-voltage curve $U_r$ of the first energy storage device 1 at least partially overlaps with the characteristic steady-voltage curve of the second energy storage device 2; see overlapping cross-hatched area 3 of the voltages illustrated in FIG. 1. This means that, in each case, there is one state-of-charge range of a storage device to which a voltage range of the respective characteristic steady-voltage curve is assigned which the respective other storage device does not cover, and in each case, there is one state-of-charge range of a storage device to which a voltage range of the respective characteristic steady-voltage curve is assigned which the respective other storage device also covers. FIG. 2 illustrates the course of the characteristic steady-voltage curve 4 of the first storage device and the course of the characteristic steady-voltage curve 5 of the second storage device with respect to the relative state-of-charge of the storage devices.

Figure 3:
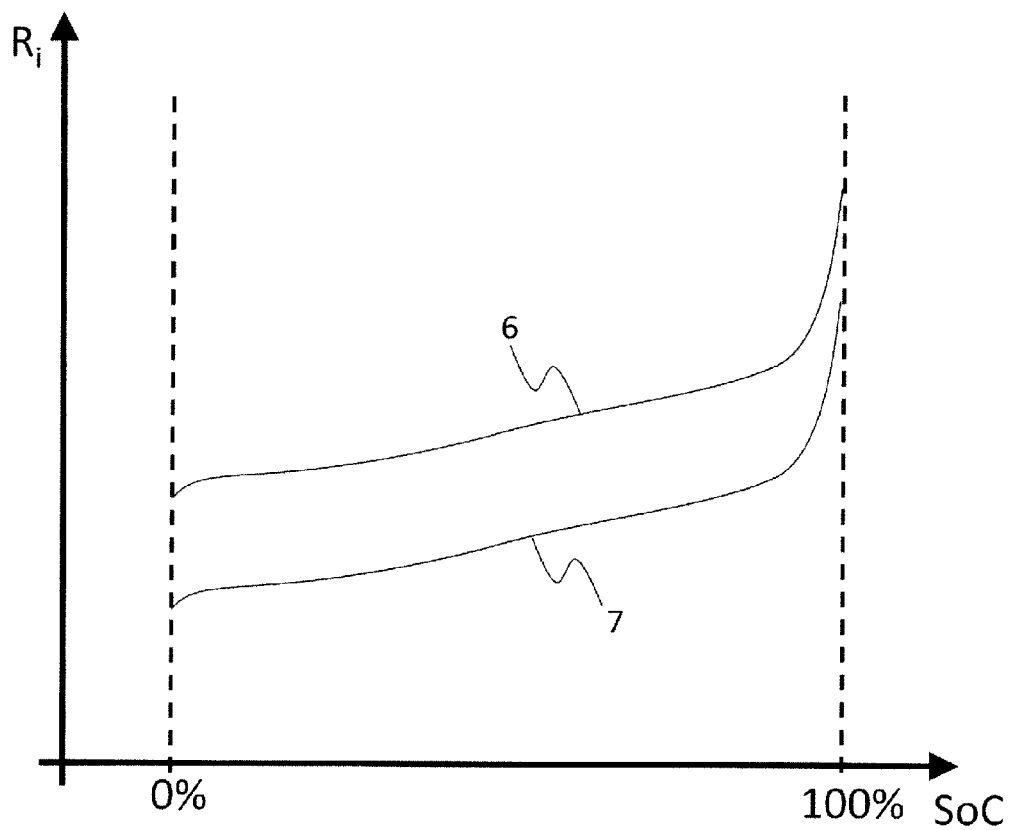
FIG. 3 is a schematic graphical view of the characteristic charging internal-resistance curves of the two energy storage devices.
Figure 4:
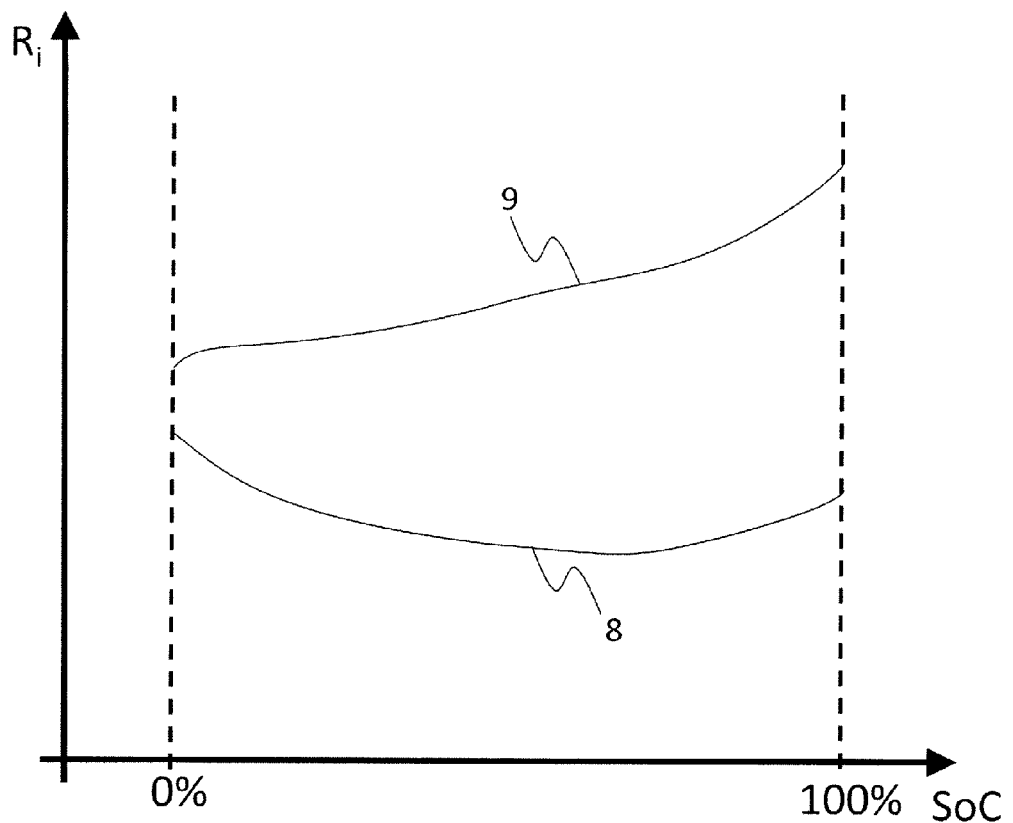
FIG. 4 is a schematic graphical view of the characteristic discharging internal-resistance curves of the two energy storage devices.

The two energy storage devices each have a state-of-charge-dependent characteristic charging internal-resistance curve and a state-of-charge-dependent characteristic discharging internal-resistance curve. The internal resistance is indicated as R. The characteristic charging internal-resistance curve of the first energy storage device (6 in FIG. 3) is essentially located in the entire relative state-of-charge range of 0% state-of-charge (SoC) to 100% SoC in the direction of higher resistances above the characteristic charging internal-resistance curve of the second energy storage device (7 in FIG. 3). The characteristic discharging internal-resistance curves exhibit an inverse course; i.e. the characteristic discharging internal-resistance curve of the first energy storage device (8 in FIG. 4 is situated essentially in the entire state-of-charge range below the characteristic discharging internal-resistance curve of the second energy storage device (9 in FIG. 4).

A lead acid battery (LAB) using wet cell or AGM technology may be provided as an example of the first energy storage device with an open-circuit voltage level of 10.5 V to approximately 13.0 V, and a lithium ion battery (LiB) may be provided as the second energy storage device. The LiB is constructed, for example, of a series connection of four cells of the electrochemical lithium iron phosphate (LiFePO$_4$) redox system at an open-circuit voltage level of 10.4 V to 14.0 V, of four cells of the electrochemical lithium nickel manganese cobalt (Li—N$_x$M$_y$C$_z$)/graphite redox system at an open-circuit voltage level of 16.6 V to 16.4 V or of six cells of the electrochemical lithium nickel manganese cobalt (Li—N$_x$M$_y$C$_z$)/lithium titanate (Li$_x$Ti$_y$O$_z$) redox system at an open-circuit voltage fluctuation of 12.0 V to 15.6 V. The second energy storage device may also be constructed as a supercapacitor.

Without any limitation to one of the represented variants, the implementation of the LiB by means of the lithium iron phosphate/graphite system will be further considered. In this case, a system is suggested with, for example, nominal capacities of the LiB of 5-20 Ah and of the LAB of 70-90 Ah.

A battery sensor, which at least unidirectionally exchanges information with a control unit of the vehicle, is assigned to the LiB. In particular, the battery sensor repeatedly measures the charging current and discharging current of the second energy storage device. As a result, a time-dependent determination of the state-of-charge of the second energy storage device, particularly during the operation of the energy storage system, becomes possible by means of the battery sensor or by means of the control unit in the form of a time-dependent integration of the current of the second energy storage device, which is formed of charging currents and discharging currents.

In the case of the coupled storage system, the same electric potential is applied because of the direct galvanic connection, which potential is called the coupling voltage.

In a state-of-charge range of approximately 0% to 100%, the LAB has an open-circuit range of approximately 10.5 V to 13.0 V. In a state-of-charge range of approximately 0% to 80%, the LiB has an open-circuit range of approximately 10.4 V to 13.2 V, in which case, the entire state-of-charge range of approximately 25% to 80% is almost situated at an open-circuit voltage level of 13.2 V. In the case of an open-circuit voltage of 13.0 V, the state-of-charge of the LiB is at approximately 15%.

Figure 2:
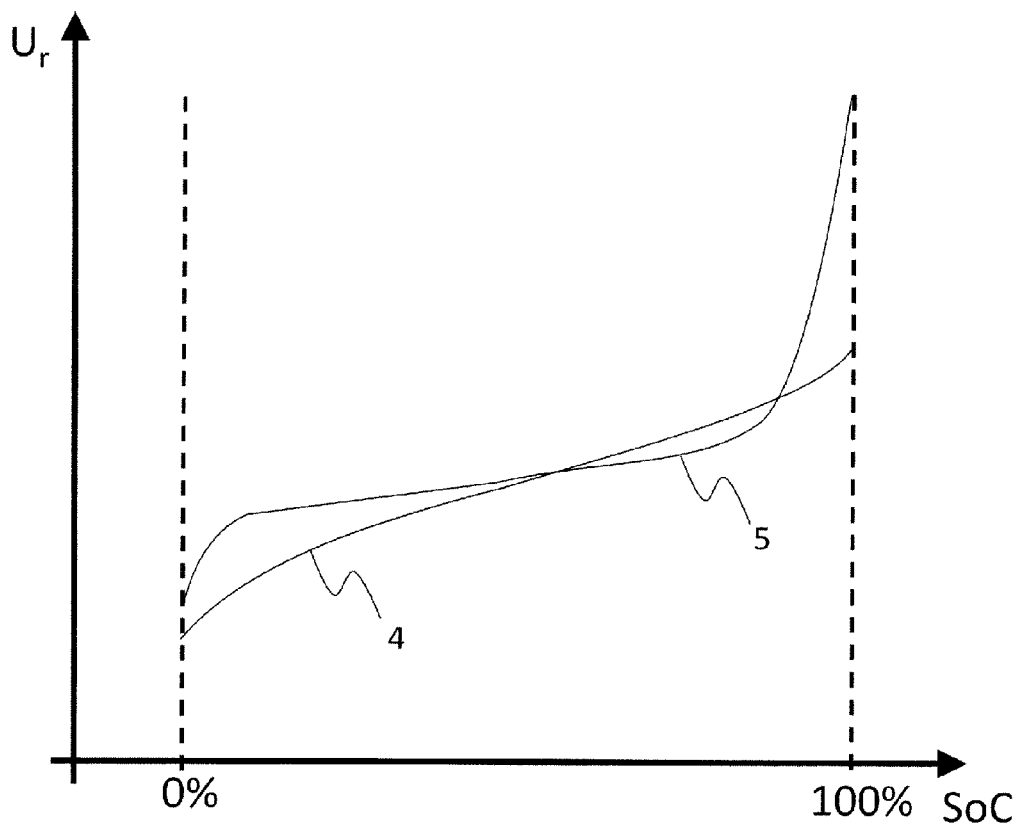
FIG. 2 is a schematic graphical view of the characteristic steady-voltage curves of the two energy storage devices as a function of the relative state-of-charge.

It is an object to operate the LiB according to FIG. 1 in a desired state-of-charge band 3 which is situated in a lower to medium state-of-charge range of approximately 5% to 60%. The state-of-charge of the LAB is therefore permanently in the full-charge range.

Particularly in the case of vehicles having a recovery function for recovering braking energy (BER) and having an automatic engine start-sop function (MSA) of the internal-combustion engine, this desired state-of-charge band has technical advantages.

In the case of the BER, a short-term raising of the voltage at the generator output is achieved by a short-term tapping of an increased torque from the drive shaft of the engine. Here, the short-term tapping is aimed at dragging phases and braking phases in which the engine is dragged along without its own drive by the kinetic energy of the vehicle. Instead of a conversion of the kinetic energy to heat in a braking system of the vehicle, the excessive kinetic energy can be converted to electric energy and stored in the coupled energy storage system. The more favorable the current draw of the coupled energy storage, the more efficiently this conversion can take place.

In the case of the MSA function, the internal-combustion engine is shut off in stopping phases of the vehicle during the running driving operation (for example, in a red phase at a traffic light) and is automatically restarted at the beginning of a subsequent driving phase. During an MSA stopping phase, the generator supplies no electric power, so that the electric consuming devices are electrically fed by the coupled energy storage system.

Without limiting generality, the maximum charging voltage of the coupled energy storage system amounts to 14.80 V. In the case of the LAB, at an overpotential starting at 400-500 mV above the open-circuit voltage level, there is significant charging of the battery; in the case of the LiB, this already takes place at an overpotential of <100 mV above the open-circuit voltage level.

It is therefore achieved by means of the coupled energy storage system in the selected desired state-of-charge band, that, at the start of the recovery phase, the LiB has a high current draw on the basis of the characteristic charging internal-resistance curve and the entire recovery energy is drawn by the LiB. If the recovery phase results in a state-of-charge of the LiB which exceeds the state-of-charge band, the LiB can be actively discharged in order to be returned to a state-of-charge which is in the desired state-of-charge range, and the generator is thereby relieved. The electric power supplied at the generator is therefore reduced and the LiB is discharged by electric consuming devices.

At an automatic engine stop as a result of the MSA function with a subsequent warm start, both energy storage devices are partially discharged at a consuming device current of a magnitude of 50-100 A. At the subsequent high current load of the coupled energy storage system by the starter of the vehicle, the low discharging internal resistance of the LAB results in a briefly high discharging of the LAB. The voltage drop of the LAB is supported by the LiB, which is discharging at a clearly lower rate than the LAB; i.e. the coupled voltage experiences a clearly lower voltage drop than normally occurs in the case of an individual LAB. The voltage-supporting function of the LiB is based on the fact that, at the beginning of the engine stopping phase, the LiB is in the desired state-of-charge band and, in the case of a conventional MSA operation after the engine stopping phase during the implementation of the warm start, has a residual state-of-charge which supports the coupled voltage.

If the MSA stopping phase with the subsequent engine start results in a state-of-charge of the LiB, which falls below the state-of-charge band, the LiB can be actively charged, in order to be guided back to a state-of-charge which is in the desired state-of-charge band. This preferably takes place by recovery. The lower coupled voltage in this state has a favorable effect on the efficiency of the recovery because the voltage that can be applied during a recovery phase will result in a higher voltage overpotential. As an alternative, the power supplied at the generator output is additionally increased outside the recovery phases in order to increase the charging current of the LiB and return it into the state-of-charge band.

As a result of the operation of the coupled energy storage system in the state-of-charge band, a simple and robust operating strategy can be implemented. This only requires a charge balancing of the LiB during the driving operation and a generator that can be automatically controlled with respect to power output. In order to keep the LiB in the desired state-of-charge band, a simple PI controller can be used.

This operating strategy combines the specific advantages of the LAB and of the LiB. On the one hand, the low discharging internal resistance of the LAB close to the full state-of-charge of the LAB is advantageous for ensuring a briefly high current delivery during the warm start. In this case, the LiB supports the voltage in the onboard power supply system before a starting voltage drop, because this voltage—as a result of its lower to medium state-of-charge—has a higher open-circuit voltage than the LAB, which acts as an overpotential for the LAB.

During the recovery, the LiB is in a partially discharged state, i.e. capable of taking current at a low charging internal resistance in comparison to the fully charged LAB. The recovery is very effective in this operating state.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle equipped with a generator and electric consuming devices, the motor vehicle comprising:
   an energy storage system comprising a first electric energy storage device and a second electric energy storage device, the second electric energy storage device being connected in parallel with the first electric energy storage device, wherein
   the first and second electric energy storage devices have at least partially overlapping open-circuit voltage characteristic curves in a voltage storage range,
   the first electric energy storage device has a first state-of-charge dependent characteristic charging internal-resistance curve and a first state-of-charge dependent characteristic discharging internal-resistance curve,
   the second electrical energy storage device has a second state-of-charge dependent characteristic charging internal-resistance curve and a second state-of-charge dependent characteristic discharging internal-resistance curve,
   the first characteristic charging internal-resistance curve extends over an entire relative state-of-charge range above the second characteristic charging internal-resistance curve in a direction of higher resistances,
   the first characteristic discharging internal-resistance curve extends over the entire relative state-of-charge range below the second characteristic discharging internal-resistance curve in the direction of higher resistances, and
   the first and second electrical energy storage devices are interconnected in a neutral voltage range.

2. The motor vehicle according to claim 1, wherein
   in an approximately fully charged state, the first electric energy storage device has an open-circuit voltage essentially corresponding to a state-of-charge of the second electrical energy storage device in a lower to medium range of relative states-of-charge.

3. The motor vehicle according to claim 2, further comprising:
   a battery sensor assigned to the second electrical energy storage device;
   a control unit, wherein
   the state-of-charge of the second electrical energy storage device is determined via the battery sensor and/or the control unit based on a time-related integration of a charging current and a discharging current of the second electrical energy storage device.

4. A method of operating an energy storage system of a motor vehicle equipped with a generator, electric consuming devices, and first and second electric energy storage devices of the energy storage system, wherein
   the second electric energy storage device is connected in parallel with the first electric energy storage device,
   the first and second electric energy storage devices have at least partially overlapping open-circuit voltage characteristic curves, in a voltage storage range,
   the first electric energy storage device has a first state-of-charge dependent characteristic charging internal-resistance curve and a first state-of-charge dependent characteristic discharging internal-resistance curve,
   the second electrical energy storage device has a second state-of-charge dependent characteristic charging internal-resistance curve and a second state-of-charge dependent characteristic discharging internal-resistance curve,
   the first characteristic charging internal-resistance curve extends over an entire relative state-of-charge range above the second characteristic charging internal-resistance curve in a direction of higher resistances,
   the first characteristic discharging internal-resistance curve extends over the entire relative state-of-charge range below the second characteristic discharging internal-resistance curve in the direction of higher resistances, and
   the first and second electrical energy storage devices are interconnected in a neutral voltage-range, the method comprising the acts of:
   setting a regenerative charging current of the energy storage system via a control unit;
   setting a consumer-related discharging current of the energy storage system;
   using the charging current and the discharging current in a time-dependent course to maintain the second electric energy storage device in a desired state-of-charge range, and
   wherein the desired state-of-charge range is an essentially medium state-of-charge of the second electric energy storage device.

5. The method according to claim 4, wherein the motor vehicle is equipped with an automatic engine stop-start system, the method further comprising the acts of:
- in an engine stop phase, via the control unit, setting the discharging current, which, in a time-dependent course, leads to a state-of-charge of the second electric energy storage device which is situated in the direction of higher states of charge below the desired state-of-charge range, and
- in driving phases, which represent non-engine stop phases, setting the regenerative charging current and the consuming-device-related discharging current by the control unit such that the charging current and the discharging current lead the state-of-charge of the second electric energy storage device in a time-dependent course into the desired state-of-charge range or maintain the state-of-charge of the second electric energy storage device in a time-dependent course in the desired state-of-charge range.

6. The method according to claim 4, wherein the motor vehicle is equipped with a braking energy recovery function, the method further comprising the acts of:
- in a recovery phase, via the control unit, setting the regenerative charging current, which, in a time-dependent course, leads to a state-of-charge of the second electric energy storage device which is situated in the direction of higher states of charge above the desired state-of-charge range, and
- in driving phases, which represent non-recovery phases, setting the regenerative charging current and the consuming-device-related discharging current set by the control unit such that the charging current and the discharging current lead the state-of-charge of the second electric energy storage device in a time-dependent course into the desired state-of-charge range or maintain the state-of-charge of the second electric energy storage device in a time-dependent course in the desired state-of-charge range.

7. The method according to claim 6, wherein the motor vehicle is equipped with an automatic engine stop-start system, the method further comprising the acts of:
- in an engine stop phase, via the control unit, setting the discharging current, which, in a time-dependent course, leads to a state-of-charge of the second electric energy storage device which is situated in the direction of higher states of charge below the desired state-of-charge range, and
- in driving phases, which represent non-engine stop phases, setting the regenerative charging current and the consuming-device-related discharging current by the control unit such that the charging current and the discharging current lead the state-of-charge of the second electric energy storage device in a time-dependent course into the desired state-of-charge range or maintain the state-of-charge of the second electric energy storage device in a time-dependent course in the desired state-of-charge range.

* * * * *